United States Patent
Hasken

(10) Patent No.: US 7,347,106 B2
(45) Date of Patent: Mar. 25, 2008

(54) TORQUE SENSOR WITH INVERTED SENSING ELEMENT AND INTEGRAL SHAFT HOUSING

(75) Inventor: Randall J. Hasken, Lanark, IL (US)

(73) Assignee: Honeywell International Inc., Morristown, NJ (US)

(*) Notice: Subject to any disclaimer, the term of this patent is extended or adjusted under 35 U.S.C. 154(b) by 40 days.

(21) Appl. No.: 11/114,885

(22) Filed: Apr. 26, 2005

(65) Prior Publication Data

US 2006/0236782 A1 Oct. 26, 2006

(51) Int. Cl.
*G01L 3/00* (2006.01)

(52) U.S. Cl. .................................... 73/862.08

(58) Field of Classification Search ............ 73/862.08, 73/866.5, 650
See application file for complete search history.

(56) References Cited

U.S. PATENT DOCUMENTS

| | | | |
|---|---|---|---|
| 3,314,034 A * | 4/1967 | Caris .............................. 338/2 |
| 4,196,337 A | 4/1980 | Jewett et al. ........ 219/121 EM |
| 5,146,790 A | 9/1992 | Fish ...................... 73/862.336 |
| 6,260,422 B1 | 7/2001 | Odachi et al. |
| 6,467,360 B1 | 10/2002 | Bogdanov .............. 73/862.333 |
| 6,532,833 B1 | 3/2003 | Lee |
| 6,559,379 B2 * | 5/2003 | Solanki et al. .............. 174/533 |
| 6,679,123 B2 * | 1/2004 | Lec .............................. 73/769 |
| 6,810,336 B2 | 10/2004 | Nakane et al. ................ 702/43 |
| 6,843,142 B2 | 1/2005 | Nagase ................... 73/862.326 |
| 6,857,500 B2 | 2/2005 | Halstead et al. ............ 180/446 |
| 7,165,455 B2 * | 1/2007 | Magee et al. ................. 73/650 |
| 2003/0000309 A1 * | 1/2003 | Lonsdale et al. ............. 73/650 |
| 2004/0144184 A1 | 7/2004 | Nakatani et al. ....... 73/862.331 |
| 2005/0001511 A1 | 1/2005 | Kalinin et al. |
| 2005/0028613 A1 | 2/2005 | Onoda et al. ......... 73/862.331 |

FOREIGN PATENT DOCUMENTS

| | | |
|---|---|---|
| DE | 10054198 A1 | 9/2001 |
| EP | 1026492 A2 | 8/2000 |
| GB | 2387911 | 10/2003 |
| WO | WO 2004/027365 A1 | 4/2004 |

OTHER PUBLICATIONS

Honeywell, *Torque Sensors-Surface Acoustic Wave (SAW) Sensing Technology*, Jan. 2005.

* cited by examiner

*Primary Examiner*—Michael Cygan
*Assistant Examiner*—Octavia Davis
(74) *Attorney, Agent, or Firm*—Kermit D. Lopez; Luis M. Ortiz; William B. Shelby

(57) ABSTRACT

Torque sensing methods and systems are disclosed. In general, a sensing element and a sensor housing can be provided for maintaining the sensing element. A plurality of wirebond posts can be assembled perpendicular to a plane of the sensing element. The sensing element can then be wire bonded to the plurality of wirebond posts, such that the sensing element, the sensor housing and the plurality of wirebond posts form a sensor housing assembly thereof for torque sensing applications thereof. The sensor housing assembly is then connected to a shaft to form a hermetic seal thereof. The sensor housing assembly can also be electrically attached to an antenna for wirelessly communicating data to and from the sensing element. The sensing element can be configured, for example, as a surface acoustic wave (SAW) sensing component.

20 Claims, 4 Drawing Sheets

TORQUE SENSOR WITH INVERTED SENSING ELEMENT AND INTEGRAL SHAFT HOUSING

TECHNICAL FIELD

Embodiments are generally related to torque sensors. Embodiments are also related to surface acoustic wave (SAW) sensing devices and components thereof. Embodiments are additionally related to torque sensors employing SAW sensing elements for torque sensing applications.

BACKGROUND OF THE INVENTION

Surface Acoustic Wave (SAW) torque sensing is an emerging technology for automotive, transportation, rail and other similar segments for use, for example, in power train and chassis applications. Significant research and development efforts have resulted in the implementation of mass-produced SAW torque sensors at a cost-effective price. Engine transmission, driveline and chassis designers are now employing SAW torque sensors that provide a competitive edge with improved vehicle safety, performance and economy.

In general, a SAW sensor is a type of device composed of resonators whose resonant frequency changes when they are strained. Working at radio frequencies, such devices can be wirelessly excited with an interrogation pulse and a resonant frequency response measured allowing strain to be calculated. Torque can then be sensed by utilizing appropriate packaging and algorithms to deduce the value of sensed properties from a returned signal.

Conventional torque sensor designs employ SAW sensing elements arranged in a configuration that includes a two-piece metal enclosure that must be welded together and then welded to the shaft. Current designs additionally include wirebond posts oriented parallel to the shaft and the plane of the sensing element thereby creating difficulty in wire-bonding and antenna attachment.

Based on the foregoing, it is believed that a key to overcoming the aforementioned drawbacks of conventional torque sensing systems and devices involves the re-orienting of the posts and a reduction of the number of welding steps required to configure a torque sensor. The methods and systems disclosed herein provide a unique solution to the aforementioned drawbacks.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved torque sensor that can detect the torque of a rotating shaft.

It is another aspect of the present invention to provide for a torque sensor employing one or more surface acoustic wave (SAW) sensing components.

It is yet another aspect of the present invention to provide for a torque sensor with inverting sensing elements and an integral shaft housing.

The aforementioned aspects and other objectives and advantages can now be achieved as described herein. Torque sensing methods and systems are disclosed. In general, a sensing element and a sensor housing can be provided for maintaining the sensing element. A plurality of wirebond posts can be assembled perpendicular to a plane of the sensing element. The sensing element can then be wire bonded to the plurality of wirebond posts, such that the sensing element, the sensor housing and the plurality of wirebond posts form a sensor housing assembly thereof for torque sensing applications thereof. The sensor housing assembly is then connected to a shaft to form a hermetic seal thereof. The sensor housing assembly can also be electrically attached to an antenna for wirelessly communicating data to and from the sensing element. The sensing element can be configured, for example, as a surface acoustic wave (SAW) sensing component.

Additionally, an insulator can be provided for insulating the wirebond posts from the sensor housing. The sensor housing can be connected to the sensing element utilizing an adhesive such as, for example, a die bond. Also, a transmitter and receiver unit may be utilized for transmitting data to and from the sensing element. Finally, interrogation electronics can be provided, which are associated with the transmitter and receiver unit. The interrogation electronics generate interrogation signals that are wirelessly transmitted from the transmitter and receiver unit to the sensing element, wherein the interrogation signal excites the sensing element, thereby generating a resonant frequency response from the sensing element, wherein the resonant frequency response provides data indicative of a torque of the shaft.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
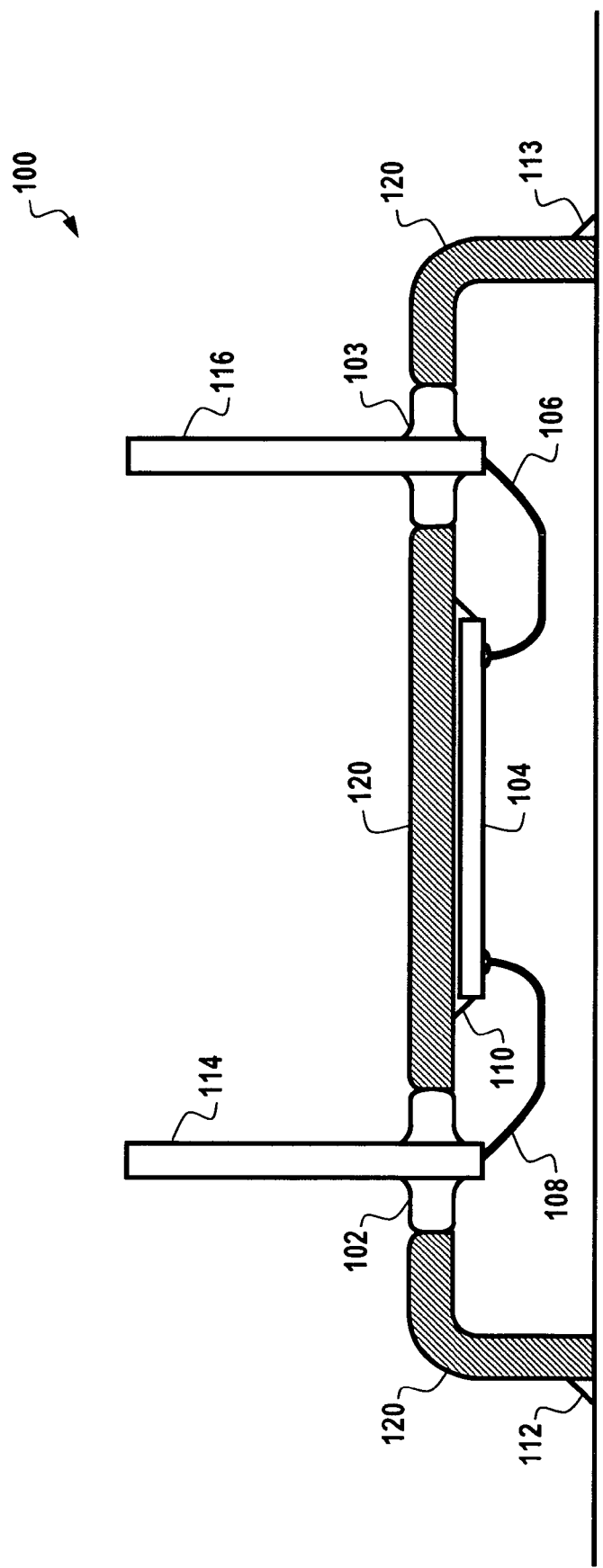
FIG. 1 illustrates a side view of a torque sensing system that includes an inverter sensing element, in accordance with a preferred embodiment.
Figure 2:
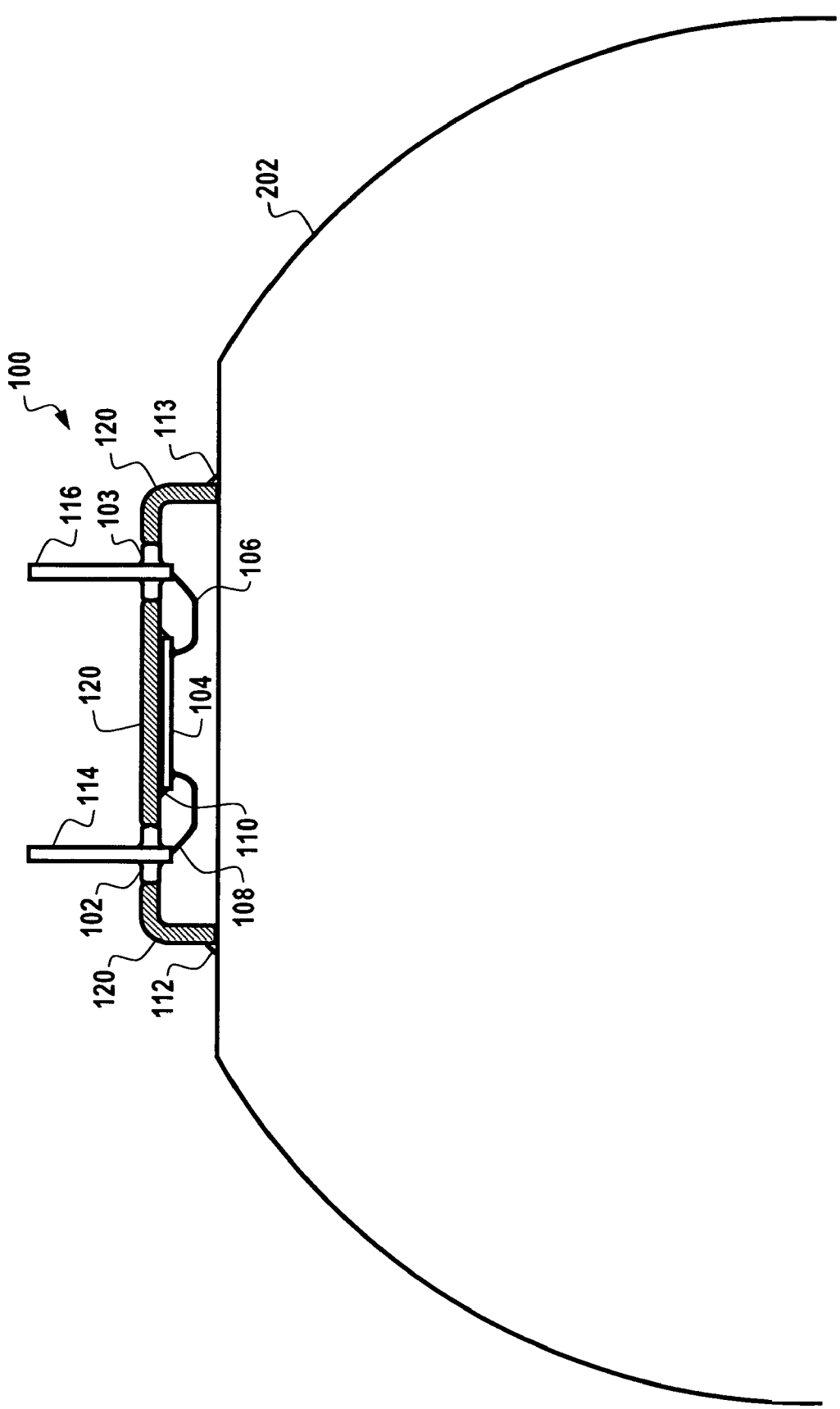
FIG. 2 illustrates a side view of the system depicted in FIG. 1 with respect to a portion of a shaft.
Figure 3:
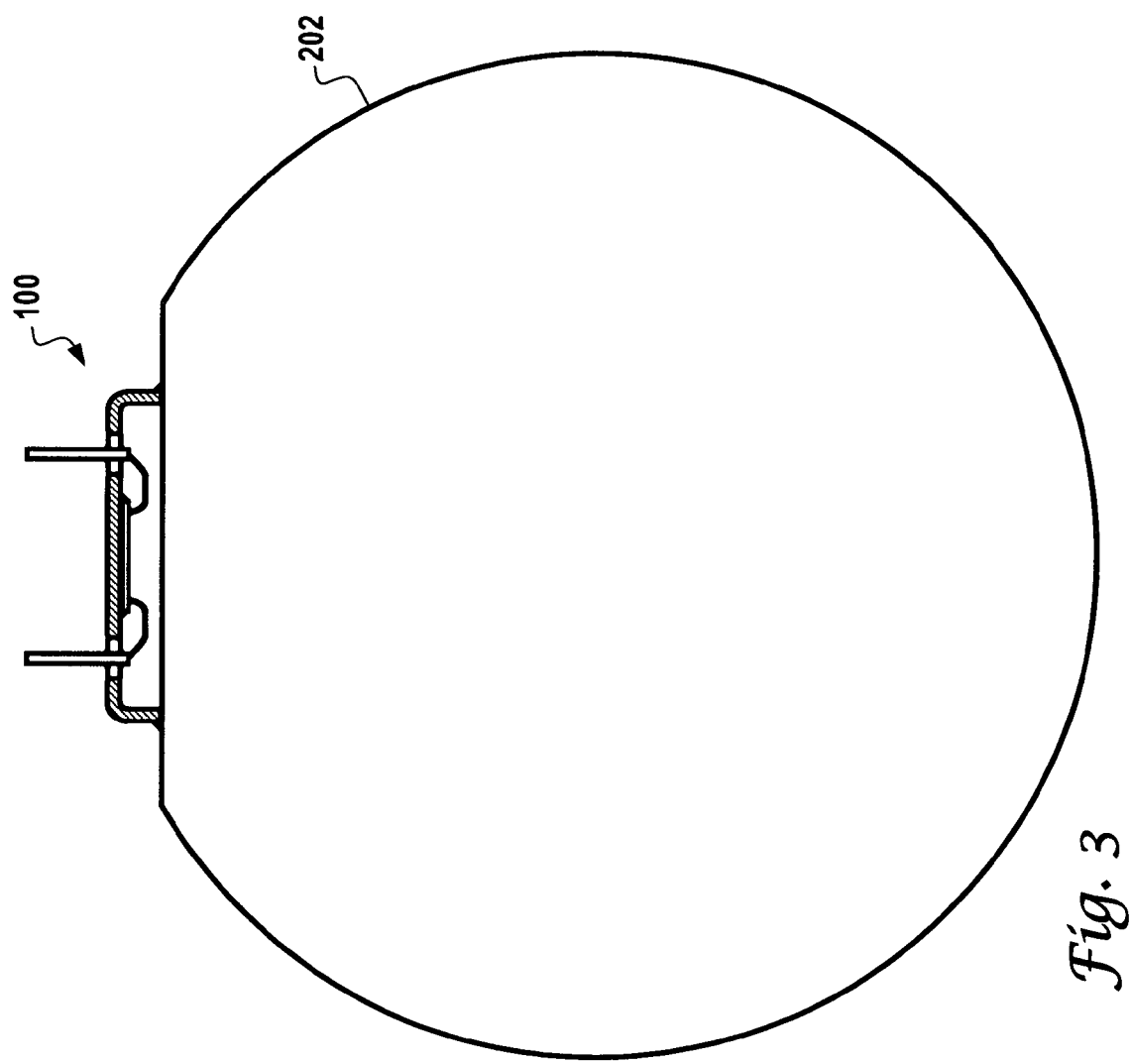
FIG. 3 illustrates a side view of the system depicted in FIGS. 1-2 with respect to the shaft.

FIG. 1 illustrates a side view of a torque sensing system 100 that includes an inverted sensing element 104, in accordance with a preferred embodiment. FIG. 2 illustrates a side view of the system 100 depicted in FIG. 1 with respect to a portion of a shaft 202. FIG. 3 illustrates a side view of the system 100 depicted in FIGS. 1-2 with respect to the shaft 202. Note that in FIGS. 1-3, identical or similar parts or components are indicated by identical reference numerals. Thus, FIGS. 1-3 can be interpreted together in order to achieve a greater understanding of fabrication and functioning of system 100.

As indicated previously, one of the problems with conventional torque sensing systems and devices is that such sensors employ a design that includes a two-piece metal enclosure that must be welded together and then welded to the shaft. Additionally, such conventional torque sensors incorporate wirebond posts that are oriented parallel to the shaft and the plane of the sensing element, thereby creating difficulty in wirebonding and antenna attachments thereof.

Torque sensing system 100 facilitates the ease of the torque sensor by eliminating the conventional cover piece and associating welding operations as well as orienting wirebond posts 114 and 116 perpendicular to the plane of the sensing element 104 for ease of wirebonding and ease of attaching one or more antennas to system 100. By flipping the sensing die or sensing element 104 with respect to the conventional designs, the wirebond posts 114 and 116 can be oriented such that the process of attaching the end of respective wirebonds 108, 106 to the posts 114, 116 is much simpler.

Further, with the wirebond posts 114, 116 positioned perpendicular to the shaft 202, electrical attachment of the wirebond posts 114, 116 to an antenna can be simplified because the wirebond posts 114, 116 are out of the way of the remaining weld operation. By the utilizing the shaft 202 under load as an integral part of the sensor enclosure, only one welding operation is required to construct a fully functional and environmentally protected second level sensor.

In general, sensing element 104 and a sensor housing 120 can be provided for maintaining the sensing element 104. A plurality of wirebond posts 114, 116 can be assembled perpendicular to the plane of the sensing element 104. The sensing element 104 can be die bonded to the housing 120 and then be wire bonded to the plurality of wirebond posts 114, 116, such that the sensing element 104, the sensor housing 120 and the plurality of wirebond posts 114, 116 form a sensor housing assembly or system 100 thereof for torque sensing applications. The sensor housing assembly or system 100 is then connected to shaft 202 to form a hermetic seal thereof. The completed sensor housing assembly or system 100 is attached to the shaft 202 with a single weld operation to complete such a hermetic seal. The sensor housing assembly or system 100 can also be electrically attached to an antenna (not shown in FIGS. 1-3) for wirelessly communicating data to and from the sensing element 104. The sensing element 104 can be configured, for example, as a surface acoustic wave (SAW) sensing component.

Figure 4:
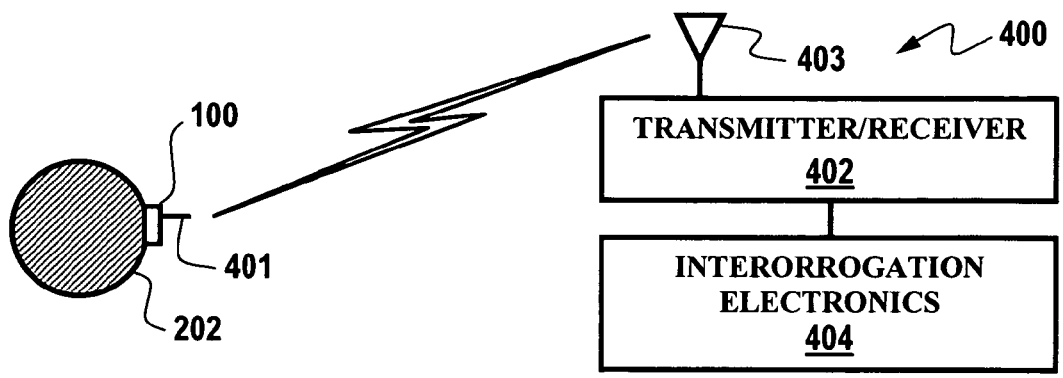
FIG. 4 illustrates a block diagram of a system, which can be implemented in accordance with one embodiment.

FIG. 4 illustrates a block diagram of a system 400, which can be implemented In accordance with one embodiment. Note that in FIGS. 1-4, identical or similar parts or elements are indicated by identical reference numerals. Thus, system 400 includes the sensor housing assembly or system 100 connected to an antenna 401. The sensor housing assembly or system 100 is located on shaft 202 in the manner indicated in FIGS. 1-3. System 400 additionally includes a transmitter/receiver unit 402 (e.g., radio frequency device), which is generally associated with interrogation electronics 404.

The transmitter/receiver 402 includes an antenna 403 that can transmit signals (i.e., excitation data) to the sensor housing assembly or system 100. The interrogation electronics 404 associated with the transmitter/receiver unit 402 generates one or more interrogation signals that are wireless transmitted from the transmitter/receiver unit 402 to said sensing element 104. Such interrogation signals excite said sensing element 104, thereby generating a resonant frequency response from said sensing element, wherein said resonant frequency response provides data indicative of a torque of said shaft 202

Figure 5:
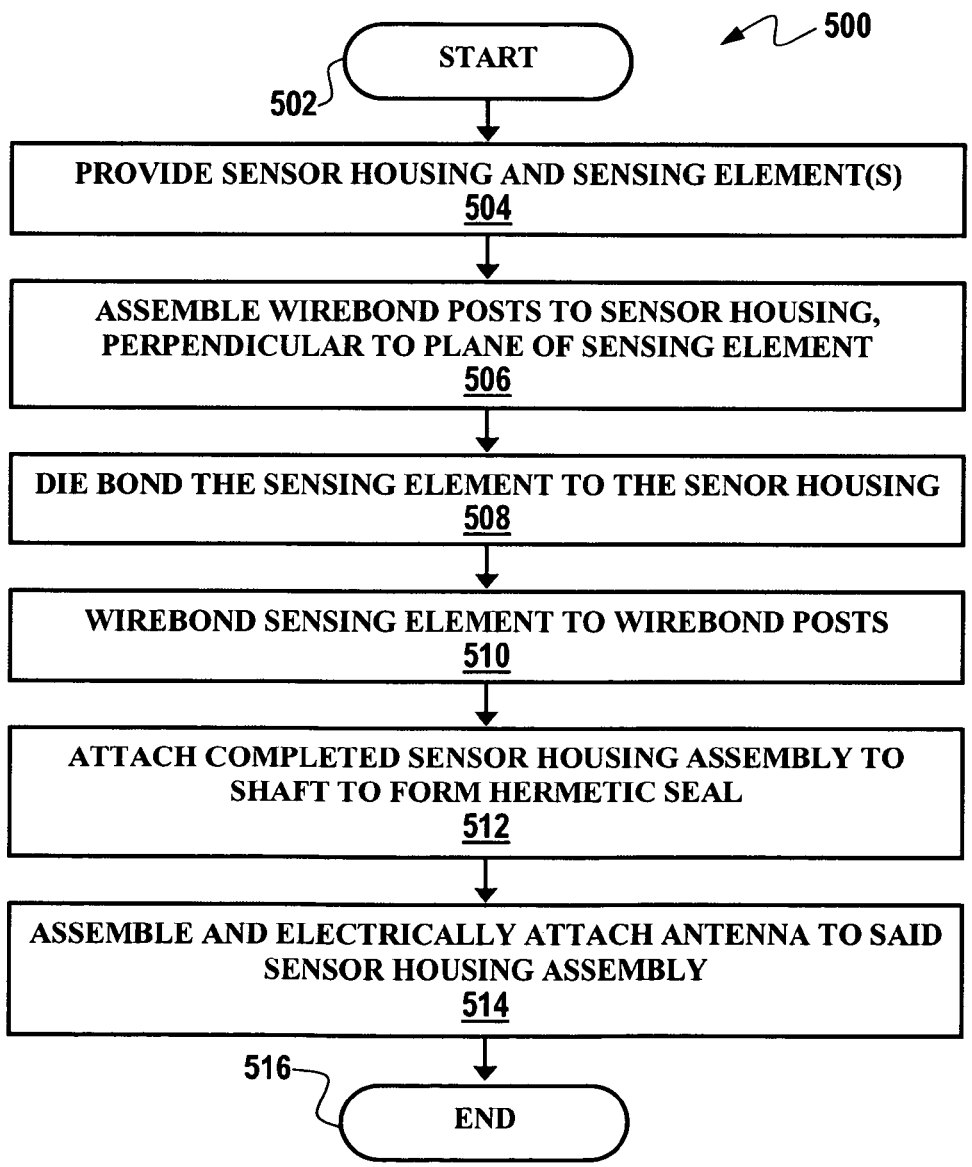
FIG. 5 illustrates a high-level flow chart of operations depicting logical operational steps that can be followed for constructing the system depicted in FIGS. 1-3.

FIG. 5 illustrates a high-level flow chart 500 of operations depicting logical operational steps that can be followed for constructing the system depicted in FIGS. 1-3. The operations depicted in flow chart 500 can therefore be interpreted in the context of FIGS. 1-4. The process can be initiated as indicated by block 502. Thereafter, as depicted at block 504, the sensor housing 120 and the sensing element 104 can be provided. Next, as depicted at block 506, the wirebond posts 114, 116 can be assembled to the sensor housing 120. The wirebond posts 114, 116 are configured perpendicular to the plane of sensing element 104. Note that one or more insulators 102, 103 can be respectively located about wirebond posts 114, 116, in order to insulate posts 114, 116.

Thereafter, as described at block 508, the sensing element 104 can be die bonded via an adhesive 110 to the sensor housing 120. Next, as depicted at block 510, the sensing element 104 can be wire bonded to the wirebond posts 114, 116 via respective wirebonds 108, 106. Thereafter, as described at block 512, the completed sensor housing assembly or system 100 can be attached to the shaft 202 with a single weld operation to complete a hermetic seal thereof. Next, as depicted at block 514, the completed sensor housing assembly or system 100 can be assembled and electrically attached to antenna 401 depicted in FIG. 4.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A torque sensing method, comprising:
   providing a sensing element and a sensor housing for maintaining said sensing element, wherein said sensing element is inverted with respect to said sensor housing and wherein said sensing element is attached to and covered by said sensor housing;
   assembling a plurality of wirebond posts perpendicular to a plane of said sensing element, wherein said plurality of wirebond posts protrude through said sensor housing; and
   wirebonding said sensing element to said plurality of wirebond posts, such that said sensing element, said sensor housing and said plurality of wirebond posts form a sensor housing assembly thereof for torque sensing applications thereof.

2. The method of claim 1 further comprising:
   attaching said sensor housing assembly to a shaft to form a hermetic seal thereof and wherein said sensor housing comprises a single component attached to said shaft.

3. The method of claim 1 further comprising:
   electrically attaching said sensor housing assembly to an antenna for wirelessly communicating data to and from said sensing element.

4. The method of claim 1 wherein said sensing element comprises a surface acoustic wave (SAW) sensing component.

5. The method of claim 1 further comprising insulating said plurality of wirebond posts from said sensor housing.

6. The method of claim 1 further comprising die bonding said sensing element to said sensor housing.

7. The method of claim 1 further comprising providing a transmitter and receiver unit for transmitting data to and from said sensing element.

8. The method of claim 7 further comprising providing interrogation electronics associated with said transmitter and receiver unit, wherein said interrogation electronics generate interrogation signal that are wireless transmitted from said transmitter and receiver unit to said sensing element, wherein said interrogation signal excites said sensing element, thereby generating a resonant frequency response from said sensing element, wherein said resonant frequency response provides data indicative of a torque of said shaft.

9. A torque sensing system, comprising:
   a sensing element and a sensor housing for maintaining said sensing element, wherein said sensing element is inverted with respect to said sensor housing and wherein said sensing element is attached to and covered by said sensor housing; and
   a plurality of wirebond posts assembled perpendicular to a plane of said sensing element, wherein said plurality of wirebond posts protrude through said sensor housing, such that said sensing element is wire bonded to said plurality of wirebond posts, wherein said sensing element, said sensor housing and said plurality of wirebond posts form a sensor housing assembly thereof for torque sensing applications thereof.

10. The system of claim 9 wherein said sensor housing assembly is attached to a shaft to form a hermetic seal thereof and wherein said sensor housing comprises a single component attached to said shaft.

11. The system of claim 9 wherein said sensor housing assembly is electrically attached to an antenna for wirelessly communicating data to and from said sensing element.

12. The system of claim 9 wherein said sensing element comprises a surface acoustic wave (SAW) sensing component.

13. The system of claim 9 further comprising an insulator for insulating said plurality of wirebond posts from said sensor housing.

14. The system of claim 9 further comprising a die bond for connecting said sensing element to said sensor housing.

15. The system of claim 9 further comprising a transmitter and receiver unit for transmitting data to and from said sensing element.

16. The system of claim 15 further comprising interrogation electronics associated with said transmitter and receiver unit, wherein said interrogation electronics generate interrogation signal that are wireless transmitted from said transmitter and receiver unit to said sensing element, wherein said interrogation signal excites said sensing element, thereby generating a resonant frequency response from said sensing element, wherein said resonant frequency response provides data indicative of a torque of said shaft.

17. A torque sensing system, comprising:
   a sensing element and a sensor housing for maintaining said sensing element, wherein said sensing element is inverted with respect to said sensor housing and wherein said sensing element is attached to and covered by said sensor housing and said sensing element comprises a surface acoustic wave (SAW) sensing component;
   a plurality of wirebond posts assembled perpendicular to a plane of said sensing element,
   an insulator for insulating said plurality of wirebond posts from said sensor housing; and
   wherein said sensing element is wire bonded to said plurality of wirebond posts, wherein said plurality of wirebond posts protrude through said sensor housing, wherein said sensing element, said sensor housing and said plurality of wirebond posts form a sensor housing assembly thereof for torque sensing applications thereof, wherein said sensor housing assembly is attached to a shaft to form a hermetic seal thereof and said sensor housing assembly is electrically attached to an antenna for wirelessly communicating data to and from said sensing element.

18. The system of claim 17 further comprising an die bond for connecting said sensing element to said sensor housing.

19. The system of claim 17 further comprising a transmitter and receiver unit for transmitting data to and from said sensing element.

20. The system of claim 19 further comprising interrogation electronics associated with said transmitter and receiver unit, wherein said interrogation electronics generate interrogation signal that are wireless transmitted from said transmitter and receiver unit to said sensing element, wherein said interrogation signal excites said sensing element, thereby generating a resonant frequency response from said sensing element, wherein said resonant frequency response provides data indicative of a torque of said shaft.

* * * * *